United States Patent [19]
Alley

[11] 3,776,267
[45] Dec. 4, 1973

[54] PRESSURE TRANSFER UNIT WITH BELLOWS

[75] Inventor: Lee Joe Alley, Whittier, Calif.

[73] Assignee: Borg-Warner Corporation, Chicago, Ill.

[22] Filed: Sept. 7, 1972

[21] Appl. No.: 287,166

[52] U.S. Cl. .............................. 137/494, 251/61.2
[51] Int. Cl. ............................................ F16k 51/00
[58] Field of Search........................ 137/494, 81, 82, 137/100, 101; 251/57, 61.2; 277/3; 92/98

[56] References Cited
UNITED STATES PATENTS
3,530,770   9/1970   McMurry et al................ 251/61.2 X

*Primary Examiner*—Henry T. Klinksiek
*Assistant Examiner*—Robert J. Miller
*Attorney*—Donald W. Banner et al.

[57] ABSTRACT

A pressure transfer unit including a bellows assembly separating an internal pressure chamber from a pressure source. An adjustable spring biases the bellows assembly to apply a predetermined pressure to fluid in the pressure chamber and to shut off fluid transfer in event of bellows failure.

14 Claims, 1 Drawing Figure

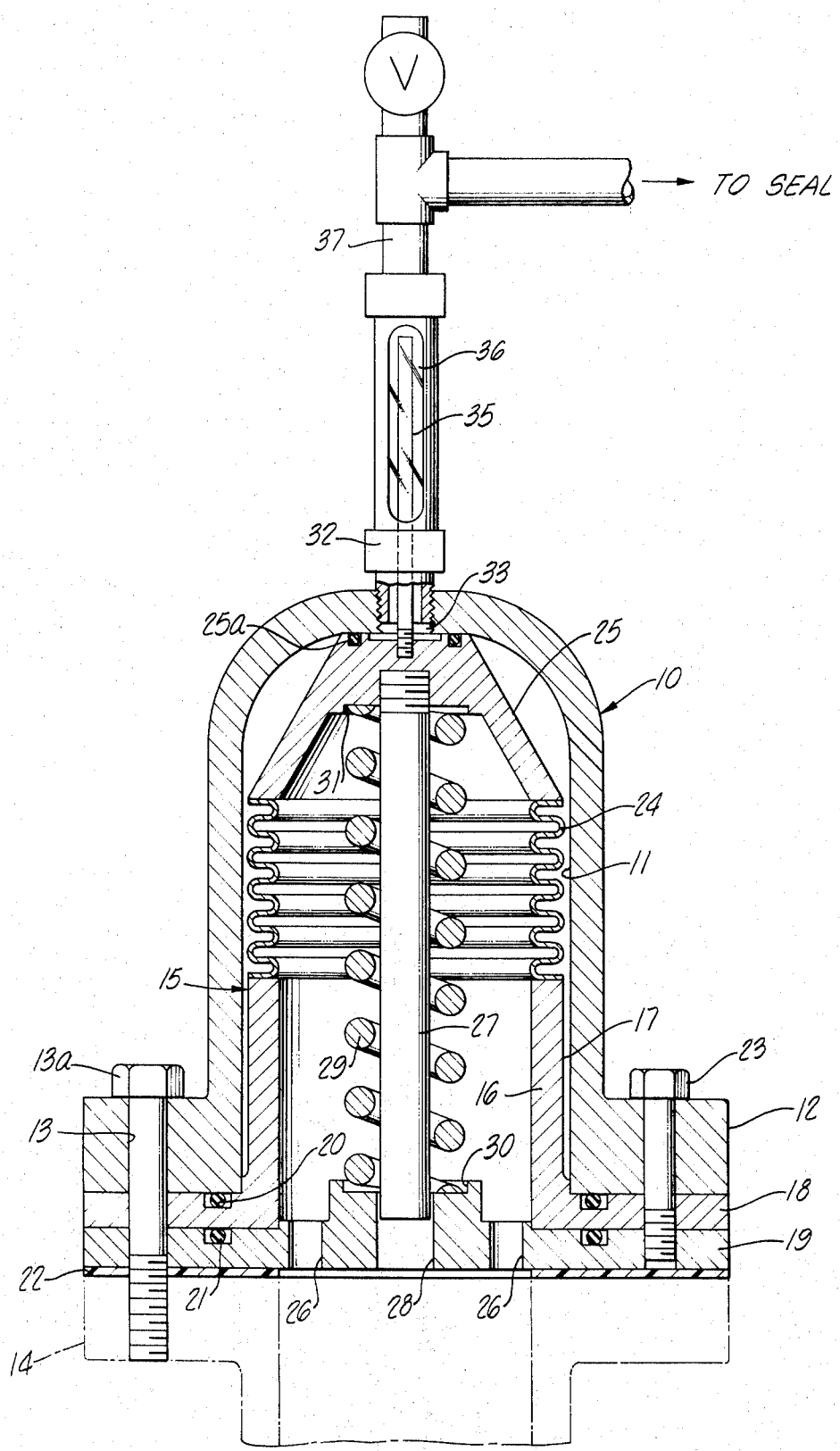

PRESSURE TRANSFER UNIT WITH BELLOWS

BACKGROUND OF THE INVENTION

It frequently occurs that fluid systems involve a need for means for separating a fluid in a conduit or vessel from another fluid which is pressurized for various purposes, say, for example, to maintain a relationship of fluid pressure in vessels or conduits, while maintaining a positive barrier between the fluids; to transmit pressure in a pressure sensing device where the fluid being sensed must be excluded from the pressure indicating means; to act as a snubber for modulating pressure surges; to feed a liquid to a system at a controlled pressure; to accumulate fluid; to translate changes pressure into mechanical action for operating various devices such as switches, solenoids, valves, and the like; and to provide a hydraulic piston.

A more specific example is shown and described in the pending application for United States Letters Patent filed June 29, 1972 Ser. No. 267,449, by Martinez, et al, for Pressurized Cooling System for Mechanical Seals, wherein a buffer fluid is pressurized in response to the pressure of fluid in a conduit, such as a pump intake, whereby the buffer fluid is maintained at a pressure in a double mechanical seal chamber greater than the pressure in the pump housing. In the pending application for Letters Patent of The United States filed Aug. 7, 1972, Ser. No. 278,475 by Charles H. Diehl, there is shown a pressure transfer unit which satisfies some of the requirements and which incorporates as the pressure transferring separator means an elastomeric diaphragm assembly. However, such diaphragms are not universally applicable due to the tendering of certain fluids to attack and or penetrate the elastomeric material.

SUMMARY OF THE INVENTION

The present invention provides a pressurizer unit which is adapted to satisfy the above needs with a simple unit which is easy to manufacture, service and repair, and which includes as its pressure transferring separator or barrier a metallic bellows.

More particularly, the present pressurizing unit is adapted to be directly mounted on a pressure conduit or vessel, without special connections other than a typical flange connection. The unit includes a bellows assembly exposed to fluid in the conduit or vessel and to a fluid to be pressurized so that pressure response is immediate, but the two fluids are completely separated. A spring acts on the bellows assembly and can be selected to establish a preset pressure on the internal fluid in the unit. The unit is so constructed that it is readily adaptable to control a system, to say, shut-down when an extra-ordinary differential pressure occurs or when predetermined motion of the bellows assembly occurs, say, in the case of downstream failure or bellows failure.

This invention possesses many other advantages, and has other purposes which may be made more clearly apparent from a consideration of forms in which it may be embodied. These forms are shown in the drawing accompanying and forming part of the present specification. They will now be described in detail, for the purpose of illustrating the general principles of the invention; but it is to be understood that such detailed descriptions are not to be taken in a limiting sense, since the scope of the invention is best defined by the appended claims.

BRIEF DESCRIPTION OF THE DRAWING

The single view shows a pressure transfer unit, made in accordance with the invention, in longitudinal section, with certain of the parts shown in elevation.

DESCRIPTION OF THE PREFERRED EMBODIMENT

As seen in the drawings the pressure transfer unit comprises a hollow housing or body 10 in the form of a bull plug providing an internal cylindrical chamber 11 and having at one end an attachment flange 12 provided with openings 13 adapted to receive suitable fasteners 13a, whereby the flange 13 may be connected to a complemental flange 14, as seen in broken lines, which forms a part of a source of fluid pressure, such as a flow conduit or a vessel. Within the housing 10 is a bellows assembly 15 including a base member 16 having a cylindrical neck 17 and a radial base flange 18 which is adapted to be clamped between the body flange 12 and a third flange 19 when the flange 12 is secured to the source flange 14 by the fasteners 13a. Suitable seal rings 20 and 21 are disposed between the flanges 12 and 18 and between the flanges 18 and 19, and a suitable gasket 22 is disposed between the flange 19 and the flange 14, all for rendering the unit fluid tight upon connection to the source flange 14. The flanges 12, 18 and 19 are held in initial assembly by means of fasteners 23 extending through the flanges 12 and 18 into the flange 19. However, final clamping of the flanges together is accomplished by the fasteners 13a.

The bellows assembly 15 includes an expansible and contractible metallic bellows 24 which is brazed or welded to the upper end of the neck 17 and to the opposing lower end of an inverted cup-like head 25. Thus, pressurizing fluid entering the bellows assembly through ports in the flange or plate 19 is isolated by the bellows assembly from the bull plug or housing 10.

Carried by the head 25 and extending axially therefrom is a guide rod 27, the lower end of which slidably extends through an opening 28 in the flange or plate 19. A coiled compression spring 29 engages between an upwardly facing seat 30 in the plate or flange 19 and a downwardly facing slot 31 on the head 25, the spring being centered about the rod 17 and acting upwardly, as shown, on the head 25 to normally bias the latter towards the top of the bull plug or housing 10. In the upper end of the bull plug or housing 10 is a fitting 32 in a port 33 for the flow of fluid to be pressurized into and from the housing 10. The head 25 constitutes valve means for closing the port 33 in the event that the housing loses sufficient fluid through the port 33 that the head 25 moves to its extreme upper position due to leakage downstream of the port or of due to a build up of pressure within the bellows assembly, as well as in the event of pressure equalization across the bellows assembly, say, due to bellows failure, in which case, the spring 29 will seat the valve head 25. Preferably, the head 25 has a valve seat 25a adapted for sealing engagement with the under surface of the housing 10.

In addition, the spring 29 provides means for presetting the pressure of fluid at the outlet 33. The spring 29 may be selected or, if desired, an adjustable seat may be provided to establish a predetermined pressure within the chamber 34 in the housing 10 by reason of the force of the spring 29 acting to move the cap 25 upwardly in the housing 10, as seen in the drawing. Thus, the pressure in the chamber 34 is a function of the sum of the force of the spring 29 and the pressure of fluid acting on the bellows assembly 15.

The fitting 32, at the outlet 33, of the illustrated embodiment, comprises a sight guage including a rod 35, visible through a sight glass 36, to indicate the position of the head 25, and thus, the quantity of fluid in the chamber 34. Connected to the fitting 32 is a conduit 37 having a filler tap or valve to allow fluid to be admitted to the system and to the chamber 34. The conduit 37 may lead, for example, to the mechanical seal in the pressurizing system of the above mentioned Martinez, et al, application, or to some other device to which pressurized fluid is to be supplied, at a pressure determined by the pressure at the source openings 26 leading into the bellows assembly.

From the foregoing it will be apparent that the invention provides a fluid pressurizing unit in which the bellow means 15 is a simple structure, whereby the unit is not only simple to assembly, but the unit is applicable to a standard source element, such as the flange 14. The unit is also simple to disassemble for service and repair.

I claim:

1. A pressure transfer unit comprising: a housing means for mounting said housing on a source of fluid and providing an inlet opening for said fluid, fluid pressure responsive separator means shiftable in said housing and exposed to said fluid, said housing having a chamber separated from said fluid opening by said separator means and adapted to contain another fluid, an outlet from said chamber for said other fluid, and spring means acting on said separator means to bias the latter in one direction, said separator means comprising an assembly including a flexible metallic bellows.

2. A pressure transfer unit as defined in claim 1, wherein said separator means comprises a valve head for closing said outlet responsive to movement in said one direction.

3. A pressure transfer unit as defined in claim 1, including a rod connected to said bellows assembly, said spring means including a coiled compression spring disposed about said rod and having an end seating on a movable portion of said bellows assembly.

4. A pressure transfer unit as defined in claim 1, wherein said means for mounting said housing includes a flange defining said opening and having means adapting said flange for connection to said source of fluid.

5. A pressure transfer unit as defined in claim 1, wherein said housing comprises a hollow body, said means for mounting said housing including a flange at one end of said body defining said opening and having means adapting said flange for connection to said source of fluid, said housing having an end wall at its other end containing said outlet.

6. A pressure transfer unit as defined in claim 1, wherein said housing comprises a hollow body, said means for mounting said housing including a flange at one end of said body defining said opening and having means adapting said flange for connection to said source of fluid, said housing having an end wall at its other end containing said outlet, said separator means including a valve head engageable with said end wall to close said outlet responsive to movement of said separator means in said one direction.

7. A pressure transfer unit as defined in claim 1, wherein said separator means comprises a stationary member attached to said housing and having a tubular neck and a shiftable member, and said bellows being sealingly connected to said neck and to said shiftable member.

8. A pressure transfer unit as defined in claim 1, wherein said separator means comprises a stationary member attached to said housing and having a tubular neck and a shiftable member, and said bellows being sealingly connected to said neck and to said shiftable member, said stationary member and said housing having companion flanges thereon connectable to said source, and seal means between said companion flanges.

9. A pressure transfer unit as defined in claim 1, wherein said separator means comprises a stationary member attached to said housing and having a tubular neck and a shiftable member, and said bellows being sealingly connected to said neck and to said shiftable member, said stationary member and said housing having companion flanges thereon connectable to said source, and seal means between said companion flanges, and including another flange engaged with said flange on said stationary member, seal means between said another flange and said flange on said stationary member, said spring means comprising a coiled spring interposed between said shiftable member and said another flange.

10. A pressure transfer unit as defined in claim 1, wherein said separator means comprises a stationary member attached to said housing and having a tubular neck and a shiftable member, and said bellows being sealingly connected to said neck and to said shiftable member, said stationary member and said housing having companion flanges thereon connectable to said source, and seal means between said companion flanges, and including another flange engaged with said flange on said stationary member, seal means between said another flange and said flange on said stationary member, said spring means comprising a coiled spring interposed between said shiftable member and said another flange, and also including a guide rod coaxial with said spring and extending reciprocably through said another flange.

11. A pressure transfer unit as defined in claim 1, wherein said separator means comprises a stationary member attached to said housing and having a tubular neck and a shiftable member, and said bellows being sealingly connected to said neck and to said shiftable member, said shiftable member including valve means for closing said outlet responsive to movement in said one direction.

12. A pressure transfer unit as defined in claim 1, wherein said separator means comprises a stationary member attached to said housing and having a tubular neck and a shiftable member, and said bellows being sealingly connected to said neck and to said shiftable member, and including indicator means visible externally of said housing to indicate the position of said shiftable member.

13. A pressure transfer unit as defined in claim 1, wherein said separator means comprises a stationary member attached to said housing and having a tubular neck and a shiftable member, and said bellows being sealingly connected to said neck and to said shiftable member, and including indicator means visible externally of said housing to indicate the position of said shiftable member, said indicator means comprising a fitting having a sight glass providing a flow passage therethrough, and a rod in said flow passage and having an end extending into said housing, and means connecting said end of said rod to said shiftable member.

14. A pressure transfer unit as defined in claim 1, wherein said separator means comprises a stationary member attached to said housing and having a tubular neck and a shiftable member, and said bellows being sealingly connected to said neck and to said shiftable member, and conduit means connected to said outlet and having valve means for enabling filling of said chamber.

* * * * *

PO-1050
(5/69)

UNITED STATES PATENT OFFICE
CERTIFICATE OF CORRECTION

Patent No. 3,776,267    Dated December 4, 1973

Inventor(s) Lee Joe Alley

It is certified that error appears in the above-identified patent and that said Letters Patent are hereby corrected as shown below:

In the Abstract, line 3, "An adjustable" should be --A--.
Col. 1, line 14, after "changes" insert --in--.
       line 33, "tendering" should be --tendency--.
       line 61, "forms" should be --a form--.
       line 62, "These forms are" should be --This form is--.
       line 64, "They" should be --It--.
       line 67, "scriptions are" should be --scription is--.
Col. 2, line 11, "drawings" should be --drawing--.
       line 40, after "ports" insert --26--.
       line 48, "rod 17" should be --rod 27--.
       line 57, after "port" insert --33--.
       line 62, "seat" should be --seal--.
Col. 3, line 1, the numeral "34" should be --11--.
       line 4, the numeral "34" should be --11--.
       line 11, the numeral "34" should be --11--.
       line 13, the numeral "34" should be --11--.
       lines 21 and 22, "bellow" should be --bellows--.
       line 23, "assembly" should be --assemble--.
       line 28, after "housing" insert a comma (,).

Signed and sealed this 9th day of July 1974.

(SEAL)
Attest:

McCOY M. GIBSON, JR.                C. MARSHALL DANN
Attesting Officer                   Commissioner of Patents